(12) United States Patent
Tsyrganovich

(10) Patent No.: US 6,717,377 B1
(45) Date of Patent: Apr. 6, 2004

(54) CIRCUIT AND METHOD FOR REDUCING EAST-WEST GEOMETRY MISMATCH BETWEEN THE TOP AND BOTTOM OF A RASTER DISPLAY

(75) Inventor: Anatoliy V. Tsyrganovich, San Jose, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 10/003,824

(22) Filed: Oct. 31, 2001

(51) Int. Cl.[7] .............................. H01J 29/56; G09G 1/04
(52) U.S. Cl. ........................................ 315/371; 315/364
(58) Field of Search ................................ 315/371, 370, 315/364, 367, 408, 411, 387, 403, 397, 393, 395

(56) References Cited

U.S. PATENT DOCUMENTS

| | | | | |
|---|---|---|---|---|
| 4,063,134 A | * | 12/1977 | Iida | 315/371 |
| 4,305,023 A | * | 12/1981 | Willis | 315/371 |
| 4,536,682 A | * | 8/1985 | ten Pierick | 315/387 |
| 4,687,972 A | * | 8/1987 | Haferl | 315/371 |
| 5,194,784 A | * | 3/1993 | Tripod | 315/371 |
| 5,218,275 A | * | 6/1993 | Truskalo | 315/368.21 |
| 5,323,092 A | * | 6/1994 | Helfrich et al. | 315/371 |
| 5,434,484 A | * | 7/1995 | Murakami | 315/371 |
| 5,475,286 A | * | 12/1995 | Jackson et al. | 315/371 |
| 5,532,765 A | * | 7/1996 | Inoue et al. | 348/807 |
| 6,246,445 B1 | * | 6/2001 | Kwon | 348/687 |

\* cited by examiner

*Primary Examiner*—Don Wong
*Assistant Examiner*—Chuc D Tran
(74) *Attorney, Agent, or Firm*—Parsons Hsue & de Runtz LLP

(57) ABSTRACT

The present disclosure describes a technique for reducing east-west geometry mismatch between the top and bottom of a raster display. This is accomplished by generating a horizontal correction signal that does not have any discontinuities. Since there are no discontinuities in the horizontal correction signal, the horizontal deflection current signal will not be distorted. As a result, there will be no east-west geometry mismatch between the top and bottom of the raster display.

22 Claims, 7 Drawing Sheets

US 6,717,377 B1

CIRCUIT AND METHOD FOR REDUCING EAST-WEST GEOMETRY MISMATCH BETWEEN THE TOP AND BOTTOM OF A RASTER DISPLAY

BACKGROUND OF THE INVENTION

1. Field of the Invention

The present invention relates to raster display systems and, more particularly, to a circuit and method for reducing east-west geometry mismatch between the top and bottom of a raster display.

2. Related Art

Raster display systems are used in a variety of applications such as televisions and computer displays. FIG. 1A shows a cross-sectional side view of a conventional raster display system 100. Raster display system 100 includes an electron gun 110, a deflection system 120, and a screen 130. Electron gun 110 generates and accelerates an electron beam 115 toward deflection system 120. Deflection system 120 deflects electron beam 115 horizontally and/or vertically at screen 130. Screen 130 includes a phosphor-coated faceplate that glows or phosphoresces when struck by electron beam 115.

Deflection system 120 includes a horizontal deflection generator 122, a horizontal deflection coil 124, a vertical deflection generator 126, and a vertical deflection coil 128. Horizontal deflection coil 124 and vertical deflection coil 128 are collectively referred to as the yoke. Although not shown, horizontal deflection coil 124 and vertical deflection coil 128 are wound at a ninety-degree angle relative to one another.

Horizontal deflection generator 122 generates a horizontal deflection current signal $I_H$. When horizontal deflection current signal $I_H$ passes through horizontal deflection coil 124, a magnetic field is created that deflects electron beam 115 horizontally. The horizontal angle of deflection (not shown) is proportional to the direction and the magnitude of horizontal deflection current signal $I_H$. Similarly, vertical deflection generator 126 generates a vertical deflection current signal $I_V$. When vertical deflection current signal $I_V$ passes through vertical deflection coil 128, a magnetic field is created that deflects electron beam 115 vertically. The vertical angle of deflection θ is proportional to the direction and the magnitude of vertical deflection current signal $I_V$.

FIG. 1B is a front view of raster display system 100. Deflection system 120 deflects electron beam 115 from a left edge LE of screen 130 to a right edge RE of screen 130 to draw a first line $L_1$. Electron beam 115 is then briefly turned off, moved downward, and brought back to left edge LE of screen 130 by deflection system 120. Electron beam 115 is then turned on and deflection system 120 deflects electron beam 115 from left edge LE of screen 130 to right edge RE of screen 130 to draw a second line $L_2$. This process continues very rapidly so that lines $L_3$ through $L_N$ (where N=1, 2, 3, . . . , N) are drawn thereby creating an raster on screen 130. Note that the raster drawn on the screen 130 shown in FIG. 1B is ideal since lines $L_N$ extend to, but not beyond, left edge LE and right edge RE.

FIG. 2A shows a conventional horizontal deflection generator 122. Horizontal deflection generator 122 includes a sawtooth generator 210 and an amplifier 220. Sawtooth generator 210 generates a horizontal sawtooth signal CS1 having a constant amplitude. FIG. 2B shows a waveform for horizontal sawtooth signal CS1. Horizontal sawtooth signal CS1 is amplified by amplifier 220, which outputs horizontal deflection current signal $I_H$.

In FIG. 2B, horizontal active time $t_{HA}$ corresponds to the time when electron beam 115 starts drawing a line $L_N$ at left edge LE of screen 130 to the time when electron beam 115 stops drawing a line $L_N$ at right edge RE of screen 130. The horizontal retrace time $t_{HR}$ corresponds to the time when electron beam 115 stops drawing a line $L_N$ at right edge RE of screen 130, moves from right edge RE of screen 130 back to left edge LE of screen 130, and starts drawing another line $L_N$.

One problem with using horizontal sawtooth signal CS1 for horizontal deflection current signal $I_H$ is that it produces a distorted raster. FIG. 2C shows a distorted raster. Lines $L_N$ at the top portion of screen 130 and the lines $L_N$ at the bottom portion of screen 130 do not extend all the way to the left edge LE of screen 130 or all the way to the right edge RE of screen 130 which produces a distorted raster. Note that the distortions may have opposite phase, depending on the particular physical implementation. In this case, the top and bottom of the raster will be wider than the middle of the raster.

FIG. 3A shows a conventional horizontal deflection generator 122' that can be used to address the problems shown in FIG. 2C. Horizontal deflection generator 122' includes a horizontal geometry correction circuit 310 and a horizontal deflection signal generator 320. Horizontal deflection signal generator 320 includes a horizontal sawtooth generator 322, a modulator 324, and an amplifier 326. Horizontal geometry correction circuit 310 generates a correction signal CS2. FIG. 3B shows a waveform for correction signal CS2. Horizontal sawtooth generator 322 generates a horizontal sawtooth signal CS1 having a constant amplitude (as shown in FIG. 2B). Correction signal CS2 modulates the amplitude of horizontal sawtooth signal CS1 via modulator 324. Modulator 324 outputs a horizontal deflection signal CS3 (not shown), which is amplified by amplifier 326. Amplifier 326 then outputs horizontal deflection current signal $I_H$.

In FIG. 3B, the vertical active time $t_{VA}$ corresponds to the time when electron beam 115 starts drawing the first line $L_1$ at the top left of screen 130 to the time when electron beam 115 stops drawing the last line $L_N$ at the bottom right of screen 130. The vertical retrace time $t_{VR}$ corresponds to the time when electron beam 115 stops drawing the last line $L_N$ at the bottom right of screen 130 to the time when electron beam 115 starts drawing the first line $L_1$ at the top left of screen 130.

A problem with using horizontal deflection signal CS3 for horizontal deflection current signal $I_H$ is that it produces asymmetry between the top and bottom of the raster on screen 130. FIG. 3C shows such a raster. Note that lines $L_N$ at the top portion of screen 130 extend beyond left edge LE and right edge RE. This results in an east-west (or left-right) geometry mismatch between the top and bottom of screen 130.

The reason that lines $L_N$ at the top portion of screen 130 extend beyond left edge LE and right edge RE is explained below. Horizontal deflection signal CS3 includes two components: horizontal sawtooth signal CS1 and correction signal CS2. When horizontal deflection signal CS3 is amplified by amplifier 326, amplifier 326 distorts the correction signal component CS2 of horizontal deflection signal CS3. In particular, amplifier 326 distorts a discontinuous portion 330 of correction signal CS2, creating a distorted signal portion 331. FIG. 3B shows a waveform for an amplifier output signal corresponding to correction signal component CS2. The reason amplifier 326 distorts discontinuous portion 330 is because amplifier 326 has a limited frequency bandwidth. Note that amplifier 326 eventually outputs a non-distorted signal portion 333.

Distorted signal 331 causes the amplitude of horizontal deflection current signal $I_H$ to increase at the time the lines $L_N$ are being drawn at the top portion of screen 130. As a result, the lines $L_N$ that are drawn at the top portion of screen 130 extend beyond left edge LE and right edge RE. Once amplifier 326 begins to output non-distorted signal portion 333, the amplitude of horizontal deflection current signal $I_H$ is not distorted and thus the lines $L_N$ that are drawn extend to, but not beyond, left edge LE and right edge RE of screen 130. Since the lines $L_N$ drawn at the top portion of screen 130 extend beyond left edge LE and right edge RE, while the lines $L_N$ drawn at the middle and bottom portions of screen 130 extend to, but not beyond, left edge LE and right edge RE, an east-west geometry mismatch between the top and bottom of screen 130 is created.

Accordingly, what is needed is a circuit and method for reducing east-west geometry mismatch between the top and bottom of a raster display.

SUMMARY OF THE INVENTION

The present invention provides a circuit and method for reducing east-west geometry mismatch between the top and bottom of a raster display. This is accomplished by generating a horizontal correction signal that does not have any discontinuities. Since there are no discontinuities in the horizontal correction signal, the horizontal deflection current signal will not be distorted. As a result, there will be no east-west geometry mismatch between the top and bottom of the raster display.

In one embodiment, a circuit for reducing east-west geometry mismatch between the top and bottom of a raster display is provided. The circuit includes a first signal generator operable to generate a first signal having a parabolic portion, a second signal generator operable to generate a second signal having a parabolic portion, and a signal combiner operable to generate a third signal by combining the first signal and the second signal so that the parabolic portion of the first signal is continuous with the parabolic portion of the second signal.

In another embodiment, a method for reducing east-west geometry mismatch between the top and bottom of a raster display is provided. The method includes generating a first signal having a parabolic portion, generating a second signal having a parabolic portion, and generating a third signal by combining the first signal and the second signal so that the parabolic portion of the first signal is continuous with the parabolic portion of the second signal.

In another embodiment, a circuit for reducing east-west geometry mismatch between the top and bottom of a raster display is provided. The circuit includes a first signal generator operable to generate a first horizontal correction signal component having a parabolic portion, a second signal generator operable to generate a second horizontal correction signal component having a parabolic portion, a signal combiner operable to generate a horizontal correction signal by combining the first horizontal correction signal component and the second horizontal correction signal component such that the horizontal correction signal is a continuous signal, and an amplifier operable to amplify the horizontal correction signal, wherein the horizontal correction signal will not be distorted when amplified by the amplifier since the horizontal correction signal is a continuous signal.

In another embodiment, a method for reducing east-west geometry mismatch between the top and bottom of a raster display is provided. The method includes generating a horizontal correction signal, wherein the horizontal correction signal is a continuous signal that will not be distorted when amplified.

Other embodiments, aspects, and advantages of the present invention will become apparent from the following descriptions and the accompanying drawings.

BRIEF DESCRIPTION OF THE DRAWINGS

For a more complete understanding of the present invention and for further embodiments, aspects, and advantages, reference is now made to the following description taken in conjunction with the accompanying drawings, in which.

DETAILED DESCRIPTION OF THE INVENTION

Figure 1A:
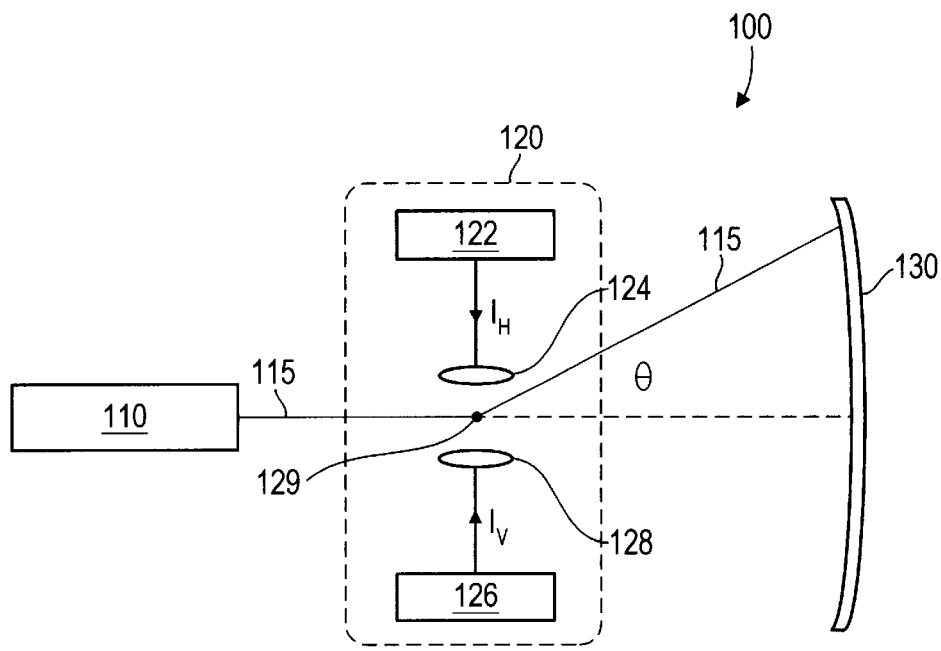
FIG. 1A shows a cross-sectional side view of a conventional raster display system.
Figure 1B:
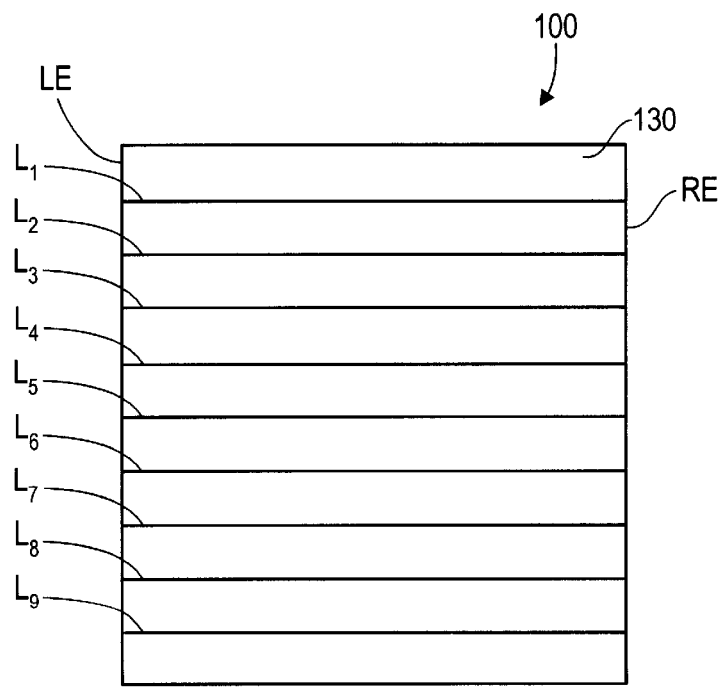
FIG. 1B is a front view of a conventional raster display system.
Figure 2A:
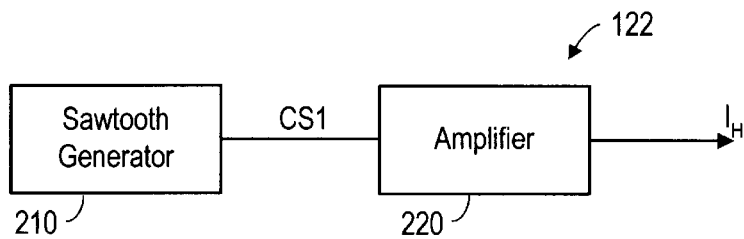
FIG. 2A shows a conventional horizontal deflection generator.
Figure 2B:
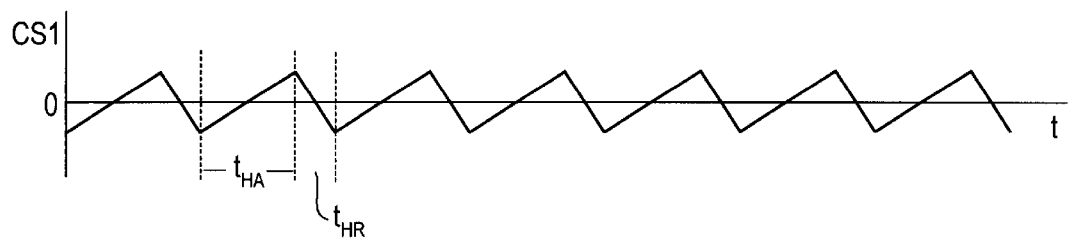
FIG. 2B shows a waveform for a horizontal sawtooth signal having a constant amplitude.
Figure 2C:
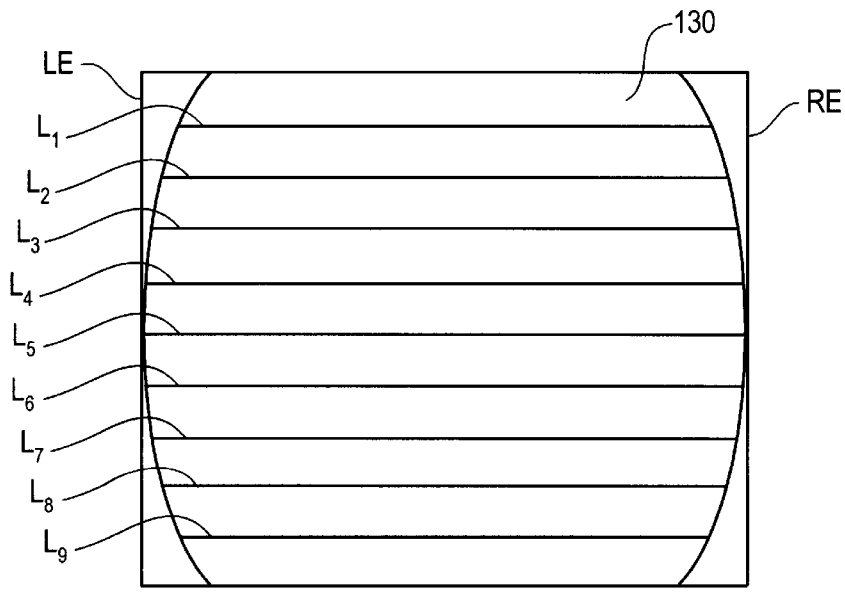
FIG. 2C shows a low-quality raster that results from using the horizontal sawtooth signal of FIG. 2B for the horizontal deflection current.

The preferred embodiments of the present invention and their advantages are best understood by referring to FIGS. 4 through 8 of the drawings. Like reference numerals are used for like and corresponding parts of the various drawings.

Figure 4:
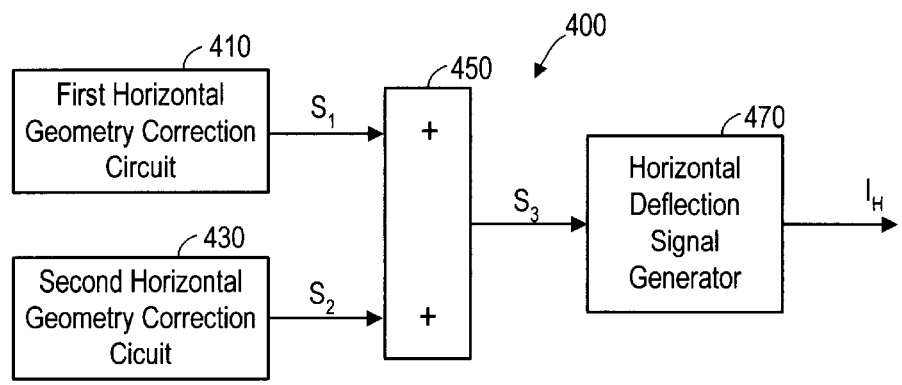
FIG. 4 shows a block diagram of a horizontal deflection generator circuit, according to some embodiments of the present invention.

Circuit for Reducing East-West Geometry Mismatch Between the Top and Bottom of a Raster Display FIG. 4 shows a block diagram of a horizontal deflection generator circuit 400, according to some embodiments of the present invention. Horizontal deflection generator circuit 400 can be used to reduce east-west geometry mismatch between the top and bottom of a raster display. Horizontal deflection generator circuit 400 includes a first horizontal geometry correction circuit 410, a second horizontal geometry correction circuit 430, a signal combiner 450, and a horizontal deflection signal generator 470. Horizontal deflection generator circuit 400 can be implemented in hardware, firmware/microcode, software, or any combination thereof. Additionally, horizontal deflection generator circuit 400 can be implemented on a single integrated circuit device.

Figure 5:
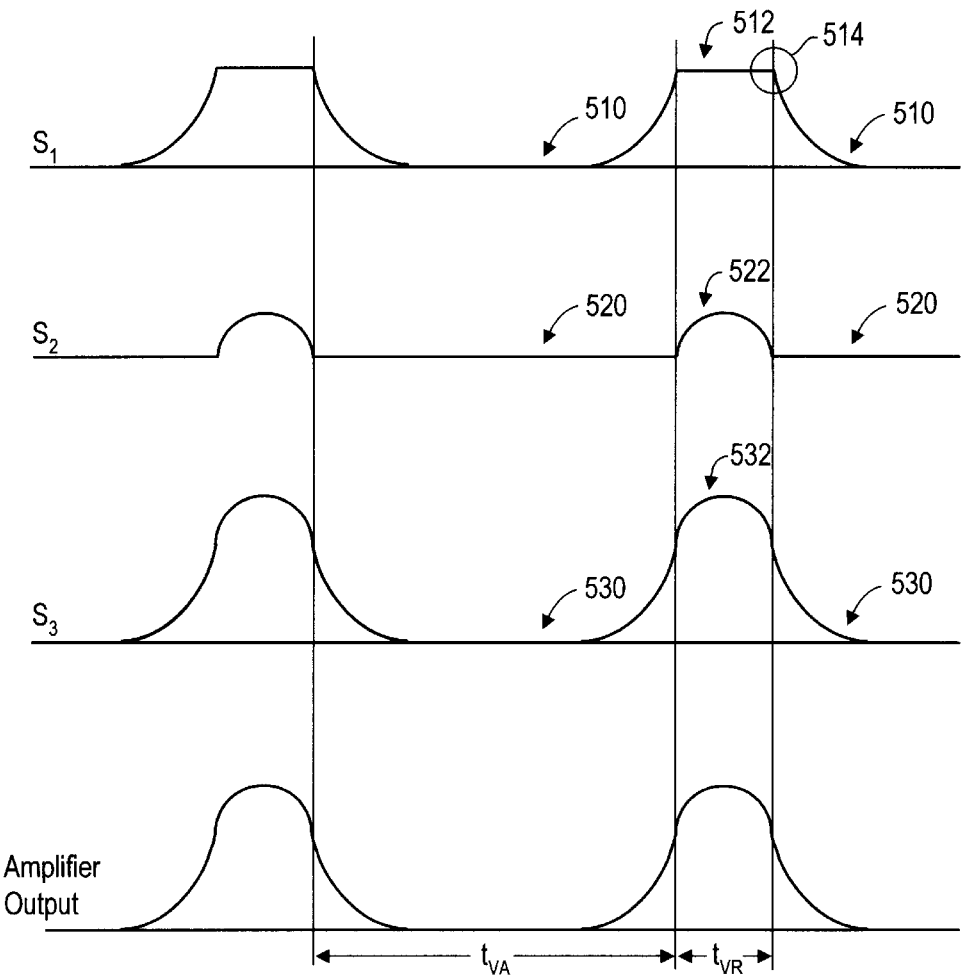
FIG. 5 shows waveforms for a first horizontal correction signal component, a second horizontal correction signal component, a horizontal correction signal, which is generated by combining the first horizontal correction signal component and the second horizontal correction signal component, and an amplifier output signal, according to some embodiments of the present invention.

First horizontal geometry correction circuit 410 generates a first horizontal correction signal component S1. FIG. 5 shows a waveform for first horizontal correction signal component S1. First horizontal correction signal component S1 has a parabolic portion 510 and an undefined portion 512. The parabolic portion 510 corresponds to vertical active time $t_{VA}$, that is, the time when the electron beam starts drawing the first line at the top left of the raster display to the time when the electron beam stops drawing the last line at the bottom right of the raster display. Undefined portion 512 corresponds to vertical retrace time $t_{VR}$, that is, the time when the electron beam stops drawing the last line at the bottom right of the raster display to the time when the electron beam starts drawing the first line at the top left of the raster display. Parabolic portion 510 is used the modulate the amplitude of a horizontal sawtooth signal (not shown) that is used for the horizontal deflection current signal $I_H$.

Figure 3A:
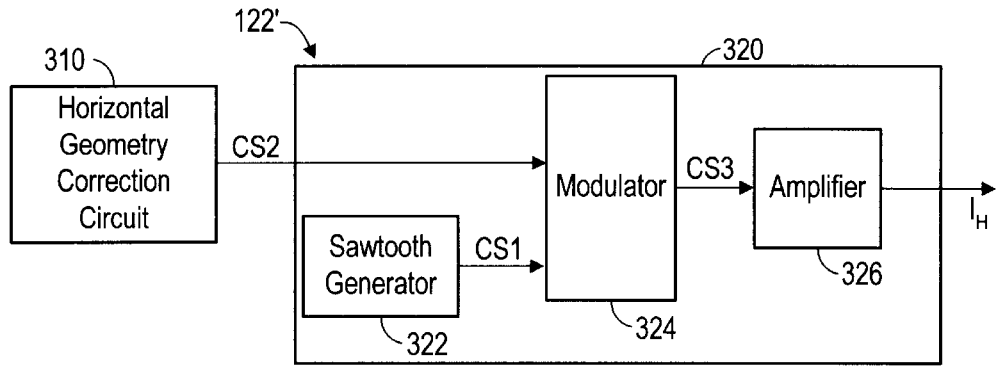
FIG. 3A shows a conventional horizontal deflection generator that can be used to address the problem shown in FIG. 2C.
Figure 3B:
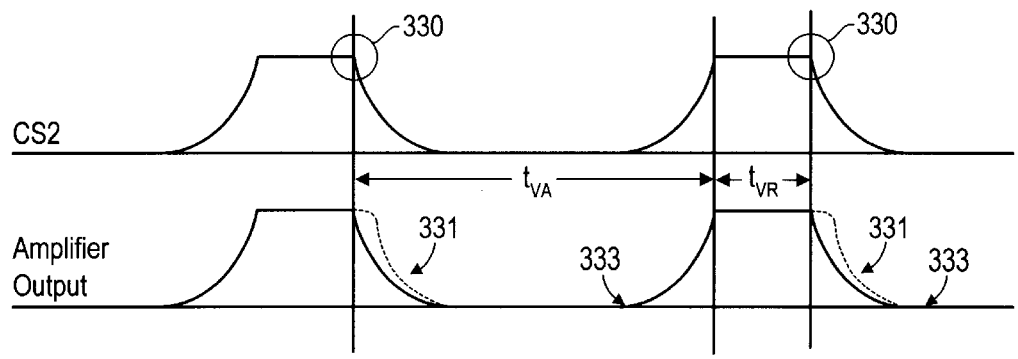
FIG. 3B shows waveforms for an amplitude correction signal and a distorted amplifier output signal.
Figure 3C:
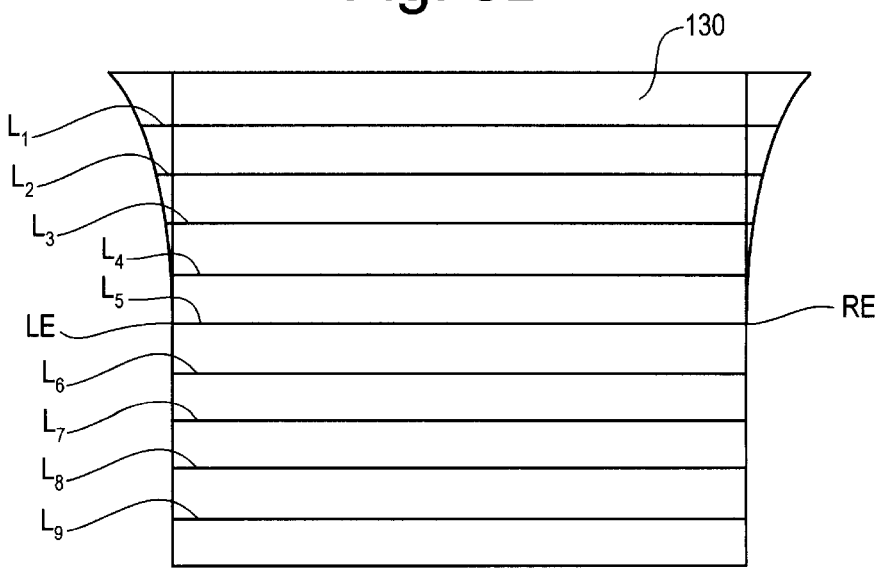
FIG. 3C shows a low-quality raster that results from using the a sawtooth signal modulated by the amplitude correction signal of FIG. 3B for the horizontal deflection current.

As explained above, using first horizontal correction signal component S1 to modulate the amplitude of a horizontal sawtooth signal is undesirable since there is a discontinuity 514 between undefined portion 512 and parabolic portion 510. In particular, when first horizontal correction signal component S1 is amplified, discontinuity 514 causes the signal output from the amplifier to be distorted. As a result, horizontal deflection current signal $I_H$ will be distorted resulting in an east-west geometry mismatch between the top and bottom of a raster display (as shown in FIG. 3C).

The present invention overcomes this problem by using second horizontal geometry correction circuit 430 to generate a second horizontal correction signal component S2. FIG. 5 shows a waveform for a second horizontal correction signal component S2. Second horizontal correction signal component S2 has a parabolic portion 520 and an undefined portion 522. Parabolic portion 520 corresponds to vertical active time $t_{VA}$ and parabolic portion 522 corresponds to vertical retrace time $t_{VR}$.

Signal combiner 450 combines first horizontal correction signal component S1 with second horizontal correction signal component S2 to produce horizontal correction signal S3. In particular, signal combiner 450 combines first horizontal correction signal component S1 with second horizontal correction signal component S2 such that a parabolic portion 510 of first horizontal correction signal component S1 is continuous with a parabolic portion 522 of second horizontal correction signal component S2 to produce horizontal correction signal S3 having a first parabolic portion 530 that is continuous with a second parabolic portion 532. FIG. 5 shows a waveform for a horizontal correction signal S3. Horizontal correction signal S3 includes first parabolic portion 530 that is continuous with a second parabolic portion 532. First parabolic portion 530 corresponds to vertical active time $t_{VA}$ and second parabolic portion 532 corresponds to vertical retrace time $t_{VR}$.

Horizontal deflection signal generator 470 uses horizontal correction signal S3 to modulate a horizontal sawtooth signal that is generated within horizontal deflection signal generator 470. The modulated horizontal sawtooth signal is then amplified and outputted as horizontal deflection current signal $I_H$. Since there are no discontinuities between first parabolic portion 530 and second parabolic portion 532, horizontal deflection current signal $I_H$ will not be distorted. As a result, there will be no east-west geometry mismatch between the top and bottom of the raster display.

It should be recognized that horizontal deflection generator circuit 400 can include other horizontal geometry correction circuits. For example, horizontal deflection generator circuit 400 may include a third horizontal geometry correction circuit that can produce a vertical sawtooth signal that can be used to modulate the horizontal sawtooth signal and thus correct trapezium geometry errors.

Figure 6:
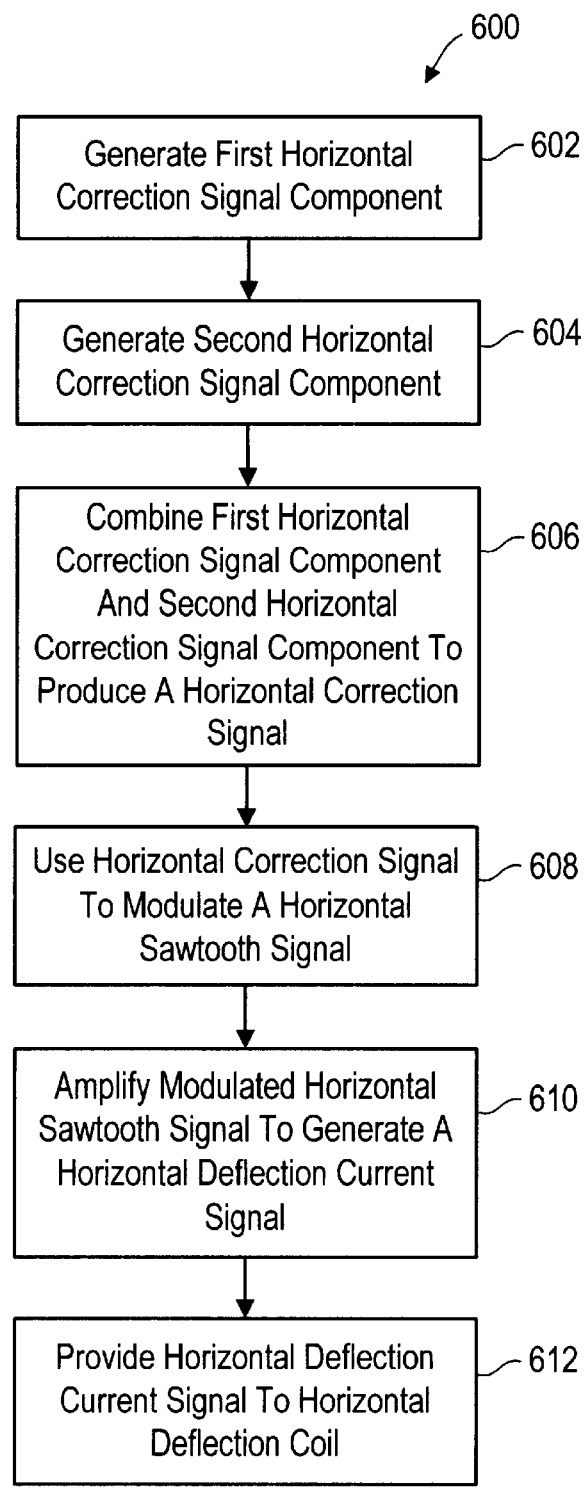
FIG. 6 shows a flow diagram of a method for reducing east-west geometry mismatch between the top and bottom of a raster display, according to some embodiments of the present invention.

Method for Reducing East-West Geometry Mismatch Between the Top and Bottom of a Raster Display FIG. 6 shows a flow diagram of a method 600 for reducing east-west geometry mismatch between the top and bottom of a raster display, according to some embodiments of the present invention. Method 600 can be performed in hardware, firmware/microcode, software, or any combination thereof. Additionally, method 600 can be performed on a single integrated circuit device.

In step 602, a first horizontal correction signal component S1 is generated. The first horizontal correction signal component can, for example, be generated by first horizontal geometry correction circuit 410.

In step 604, a second horizontal correction signal component S2 is generated. The second horizontal correction signal component can, for example, be generated by second horizontal geometry correction circuit 430.

In step 606, first horizontal correction signal component S1 and second horizontal correction signal component S2 are combined to produce horizontal correction signal S3. First horizontal correction signal component S1 and second horizontal correction signal component S2 are combined such that there are no discontinuities in horizontal correction signal S3. First horizontal correction signal component S1 and second horizontal correction signal component S2 can, for example, be combined using signal combiner 450.

In step 608, horizontal correction signal S3 is used to modulate a horizontal sawtooth signal and thus produce a modulated horizontal deflection signal. Horizontal correction signal S3 can, for example, modulate the horizontal sawtooth signal using horizontal deflection signal generator 470.

In step 610, the modulated horizontal correction signal is amplified to produce a horizontal deflection current signal $I_H$. The modulated horizontal correction signal can, for example, be amplified by an amplifier within horizontal deflection signal generator 470 to produce a horizontal deflection current signal $I_H$.

Figure 7:
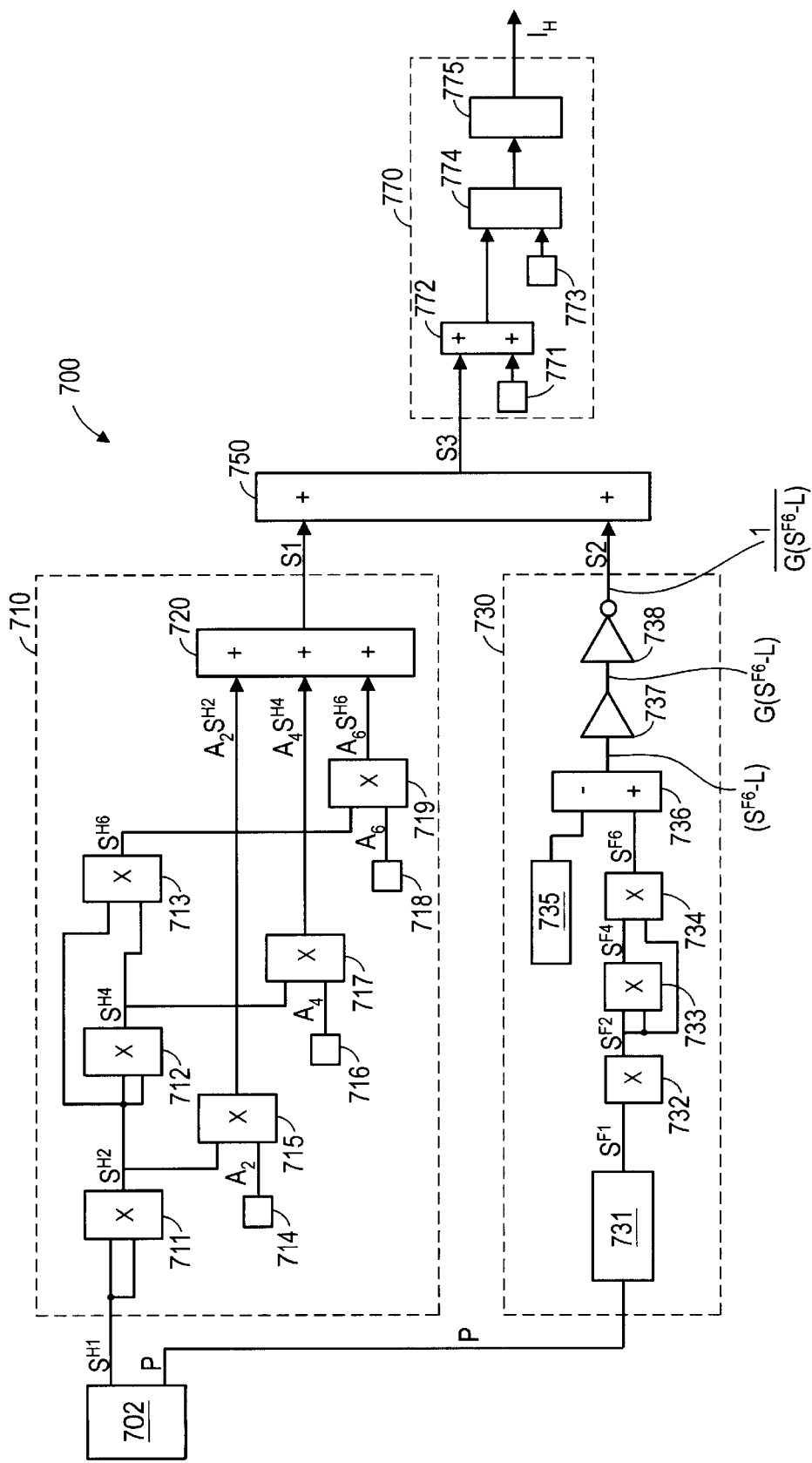
FIG. 7 shows a schematic diagram of a horizontal deflection generator circuit, according to some embodiments of the present invention.
Figure 8:
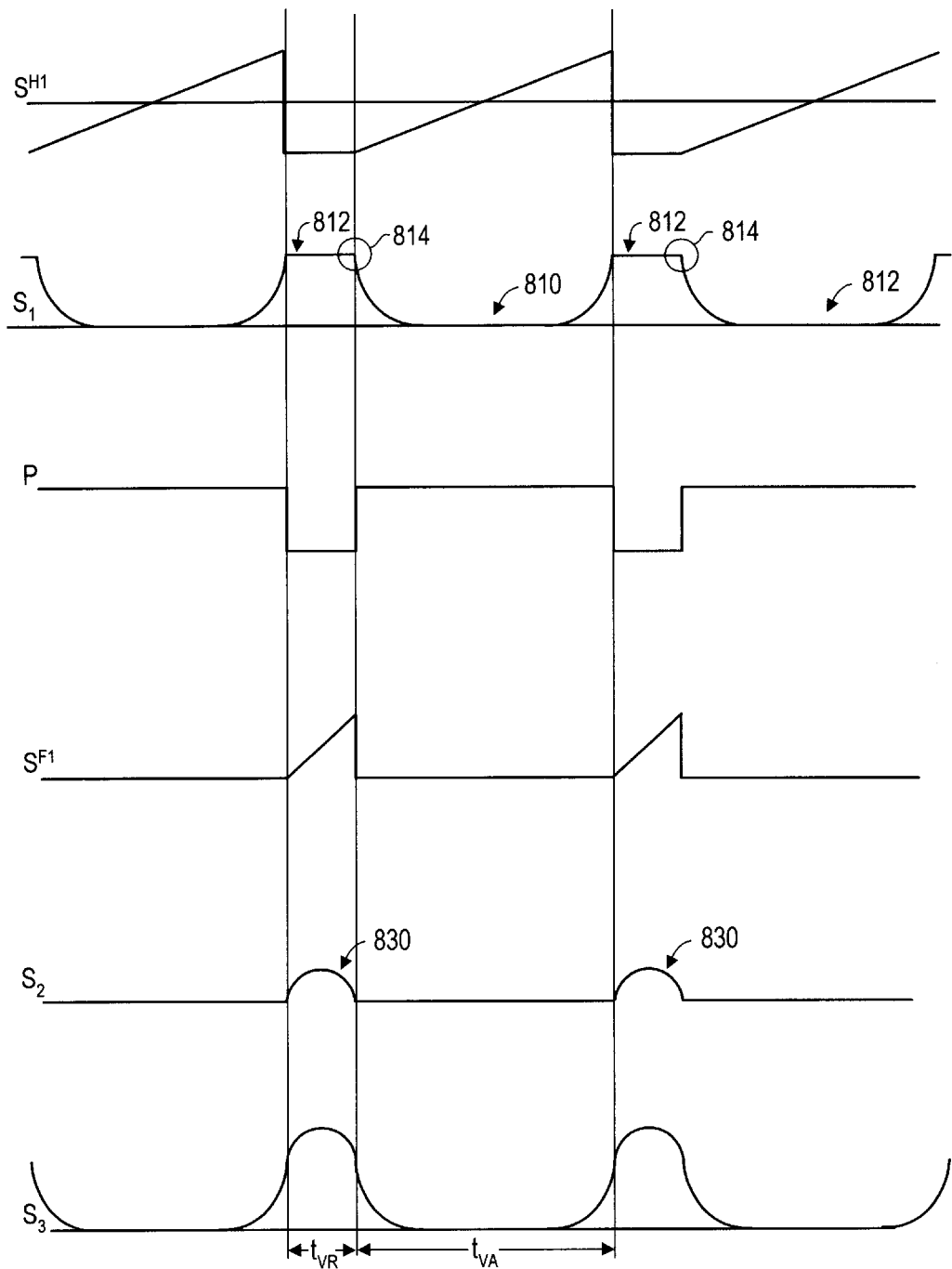
FIG. 8 shows waveforms for some of the signals within the horizontal deflection generator circuit of FIG. 7.

In step 612, horizontal deflection current signal $I_H$ is provided to a horizontal deflection coil in a raster display system. Since there are no discontinuities in horizontal correction signal S3, horizontal deflection current signal $I_H$ will not be distorted. As a result, there will be no east-west geometry mismatch between the top and bottom of the raster display Detailed Circuit for Reducing East-West Geometry Mismatch Between the Top and Bottom of a Raster Display FIG. 7 shows a schematic diagram of a horizontal deflection generator circuit 700, according to some embodiments of the present invention. Horizontal deflection generator circuit 700 includes a horizontal first-order signal generator 702, a first horizontal geometry correction circuit 710, a second horizontal geometry correction circuit 730, a signal combiner 750, and a horizontal correction signal generator circuit 770. Horizontal deflection generator circuit 700 can be implemented in hardware, firmware/microcode, software, or any combination thereof. Additionally, horizontal deflection generator circuit 700 can be implemented on a single integrated circuit device or integrated with other circuits on a single integrated circuit device. To clarify the operation of horizontal deflection generator circuit 700, FIG. 8 shows waveforms for some of the signals generated within horizontal deflection generator circuit 700.

First horizontal geometry correction circuit 710 includes multipliers 711, 712, and 713, an amplitude signal generator 714, a multiplier 715, an amplitude signal generator 716, a multiplier 717, an amplitude signal generator 718, a multiplier 719, and a signal combiner 720.

In operation, multiplier 711 multiplies a horizontal first-order signal $S^{H1}$ with itself to produce a horizontal second-order signal $S^{H2}$. Horizontal first-order signal $S^{H1}$ is generated by horizontal first-order signal generator 702. A waveform for horizontal first-order signal $S^{H1}$ is shown in FIG. 8. Multiplier 712 multiplies horizontal second-order signal $S^{H2}$ with itself to produce a horizontal fourth-order signal $S^{H4}$. Multiplier 713 multiplies horizontal second-order signal $S^{H2}$ with horizontal fourth-order signal $S^{H4}$ to produce a horizontal sixth-order signal $S^{H6}$. Amplitude signal generators 714, 716, and 718 generate amplitude signals $A_2$, $A_4$, and $A_6$, respectively.

Multiplier 715 multiplies horizontal second-order signal $S^{H2}$ with amplitude signal $A_2$ to generate a horizontal second-order signal component $A_2S^{H2}$. Multiplier 717 multiplies horizontal fourth-order signal $S^{H4}$ with amplitude signal $A_4$ to generate a horizontal fourth-order signal component $A_4S^{H4}$. Multiplier 719 multiplies horizontal sixth-order signal $S^{H6}$ with amplitude signal $A_6$ to generate a horizontal sixth-order signal component $A_6S^{H6}$. Signal combiner 720 sums horizontal second-order signal component $A_2S^{H2}$, horizontal fourth-order signal component $A_4S^{H4}$, and horizontal sixth-order signal component $A_6S^{H6}$ together to produce first horizontal correction signal component S1. A waveform for first horizontal correction signal component S1 is shown in FIG. 8.

As explained above, using first horizontal correction signal component S1 to modulate the amplitude of a horizontal sawtooth signal is undesirable since there is a discontinuity 814 between undefined portion 812 and parabolic portion 810. In particular, when first horizontal correction signal component S1 is amplified, discontinuity 514 causes the output of the amplifier to be distorted. As a result, horizontal deflection current signal $I_H$ will be distorted resulting in an east-west geometry mismatch between the top and bottom of a raster display (as shown in FIG. 3C.)

The present invention overcomes this problem by using second horizontal geometry correction circuit 730 to generate a second horizontal correction signal component S2. Second horizontal geometry correction circuit 730 includes a first-order signal generator 731, multipliers 732, 733, and 734, level shifter 735, signal combiner 736, gain controller 737, and inverter 738.

In operation, first-order signal generator 731 detects the falling edge of a pulse signal P received from horizontal first-order signal generator 704. A waveform for pulse signal P is shown in FIG. 8. The falling edge of pulse signal P causes first-order generator 731 to generate a first-order signal $S^{F1}$. A waveform for first-order signal $S^{F1}$ is shown in FIG. 8. Multiplier 732 multiplies first-order signal $S^{F1}$ with itself to produce a horizontal second-order signal $S^{F2}$. Multiplier 733 multiplies horizontal second-order signal $S^{F2}$ with itself to produce a horizontal fourth-order signal $S^{F4}$. Multiplier 734 multiplies horizontal second-order signal $S^{F2}$ with horizontal fourth-order signal $S^{F4}$ to produce a horizontal sixth-order signal $S^{F6}$. Level shifter 735 generates a level shifting signal L. Level shifter 735 can be programmed to output any predetermined value for level shifting signal L. Signal combiner 736 combines horizontal sixth-order signal $S^{F6}$ with level shifting signal L to shift the level of sixth-order signal thereby producing signal ($S^{F6}$-L). Gain controller 737 controls the gain G of signal ($S^{F6}$-L) and produces signal G($S^{F6}$-L). Gain controller 737 can be programmed to apply any predetermined gain value to signal ($S^{F6}$-L). Inverter 738 inverts signal G($S^{F6}$-L) and produces a second horizontal correction signal component S2. A waveform for second horizontal correction signal component S2 is shown in FIG. 8.

Signal combiner 750 combines first horizontal correction signal component S1 with second horizontal correction signal component S2 to produce horizontal correction signal S3. A waveform for horizontal correction signal S3 is shown in FIG. 8. It is important to note that the parabolic portion 810 of first horizontal correction signal component S1 is joined with the parabolic portion 830 of second horizontal correction signal component S2 such that horizontal correction signal S3 is a continuous signal. In other words, there are no discontinuities in horizontal correction signal S3.

Horizontal deflection signal generator 770 includes a horizontal size generator 771, a signal combiner 772, a horizontal sawtooth generator 773, a modulator 774, and an amplifier 775. In operation, horizontal size generator 771, which is programmable, generates a signal that is used to control the horizontal size of the raster generated on a raster display. Signal combiner 772 combines horizontal correction signal S3 and the signal generated by horizontal size generator 771. Modulator 774 receives a horizontal sawtooth signal from horizontal sawtooth generator 773 and modulates the horizontal sawtooth signal with the signal output from signal combiner 772. Amplifier 775 amplifies the signal output by modulator 774 and outputs horizontal deflection current $I_H$. Since there are no discontinuities in horizontal correction signal S3, horizontal deflection current signal $I_H$ will not be distorted. As such, there will be not be an east-west geometry mismatch between the top and bottom of the raster display.

It should be recognized that horizontal deflection generator circuit 700 can include other horizontal geometry correction circuits. For example, horizontal deflection generator circuit 700 may include a third horizontal geometry correction circuit that can produce a vertical sawtooth signal that can be used to modulate the horizontal sawtooth signal and thus correct trapezium geometry errors.

It should also be recognized that the circuits within horizontal deflection generator circuit 700 are merely exemplary circuits. A variety of different circuits, all of which are within the scope of the present invention, can be used for first horizontal geometry correction circuit 710 and for second horizontal geometry correction circuit 730. All that is required is that the circuits generate a horizontal correction signal S3 that has a continuous waveform that is not distorted when amplified.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

What is claimed is:

1. A circuit for reducing east-west geometry mismatch between the top and bottom of a raster display, the circuit comprising:
   a first signal generator operable to generate a first horizontal correction signal having a parabolic portion;
   a second signal generator operable to generate a second horizontal correction signal having a parabolic portion; and
   a signal combiner operable to generate a third signal by combining the first signal and the second signal so that the parabolic portion of the first signal is continuous with the parabolic portion of the second signal.

2. The circuit of claim 1 further comprising a horizontal deflection coil operable to receive the third signal.

3. The circuit of claim 1 wherein the first signal generator comprises:
   a sawtooth generator operable to generate a sawtooth signal;
   one or more multipliers operable to generate one or more higher-order signals from the sawtooth signal; and
   a signal combiner operable to combine one or more of the higher-order signals to generate the first signal.

4. The circuit of claim 1 wherein the second signal generator comprises:
   a sawtooth generator operable to generate a sawtooth signal;
   one or more multipliers operable to generate one or more higher-order signals from the sawtooth signal; and
   a signal combiner operable to combine one or more of the higher-order signals to generate the second signal.

5. The circuit of claim 1 wherein the second signal generator includes a level shifter.

6. The circuit of claim 1 wherein the second signal generator includes an inverter.

7. The circuit of claim 1 wherein the second signal generator includes a gain controller.

8. The circuit of claim 1 wherein the circuit is implemented on a single integrated circuit device.

9. A method for reducing east-west geometry mismatch between the top and bottom of a raster display, the method comprising generating a third signal by combining a first signal having a parabolic portion with a second signal having a parabolic portion so that the parabolic portion of the first signal is continuous with the parabolic portion of the second signal.

10. The method of claim 9 further comprising providing the third signal to a horizontal deflection coil.

11. The method of claim 9 further comprising generating the first signal.

12. The method of claim 11 wherein generating the first signal comprises:
    generating a sawtooth signal;
    generating one or more higher-order signals from the sawtooth signal; and
    using one or more of the higher-order signals to generate the first signal.

13. The method of claim 9 further comprising generating the second signal.

14. The method of claim 13 wherein generating the second signal comprises:
    generating a sawtooth signal;
    generating one or more higher-order signals from the sawtooth signal; and
    using one or more of the higher-order signals to generate the second signal.

15. The method of claim 9 further comprising shifting the level of the second signal.

16. The method of claim 9 further comprising inverting the second signal.

17. The method of claim 9 further comprising increasing or decreasing the amplitude of the second signal.

18. The method of claim 9 wherein the method is performed on a single integrated circuit.

19. A circuit for reducing east-west geometry mismatch between the top and bottom of a raster display, the circuit comprising:
    a first signal generator operable to generate a first horizontal correction signal component having a parabolic portion;
    a second signal generator operable to generate a second horizontal correction signal component having a parabolic portion;
    a signal combiner operable to generate a horizontal correction signal by combining the first horizontal correction signal component and the second horizontal correction signal component such that the horizontal correction signal is a continuous signal; and
    an amplifier operable to amplify the horizontal correction signal, wherein the horizontal correction signal will not be distorted when amplified by the amplifier since the horizontal correction signal is the continuous signal.

20. The circuit of claim 19 further comprising a modulator operable to modulate an amplitude of a horizontal sawtooth signal using the horizontal correction signal.

21. The circuit of claim 19 further comprising:
    a modulator operable to modulate an amplitude of a horizontal sawtooth signal using the horizontal correction signal to generate an amplitude modulated horizontal sawtooth signal; and
    a horizontal deflection coil coupled to the receive the amplitude modulated horizontal sawtooth signal.

22. A method of claim 19 wherein the circuit is implemented on a single integrated circuit.

* * * * *